United States Patent [19]

Jacobs

[11] Patent Number: 4,481,733
[45] Date of Patent: Nov. 13, 1984

[54] FLOWERPOT

[76] Inventor: Daryl E. Jacobs, 16962 Lark, Huntington Beach, Calif. 92649

[21] Appl. No.: 520,550

[22] Filed: Aug. 5, 1983

[51] Int. Cl.³ .............................................. A01G 9/04
[52] U.S. Cl. ........................................... 47/71; 47/66
[58] Field of Search .................. 47/66, 67, 68, 69, 70, 47/71; 312/204

[56] References Cited

U.S. PATENT DOCUMENTS 964,196 7/1910 Aul .......................................... 47/71

Primary Examiner—Robert E. Bagwill
Assistant Examiner—Bradley M. Lewis
Attorney, Agent, or Firm—Edward D. O'Brian; K. H. Boswell

[57] ABSTRACT

A container for use in growing plants—a flowerpot—can be effectively utilized to hide things or objects such as keys, notes, money and the like so that such things or objects can be retrieved as desired by modifying such container structures so as to include within their bottoms downwardly opening water impervious recesses. A holder or holding structure is preferably utilized in association with the recess in such a flowerpot for the purpose of supporting things or objects above the bottom of the receptacle so that such things or objects will not be damaged by water contacting the bottom of the pot.

6 Claims, 4 Drawing Figures

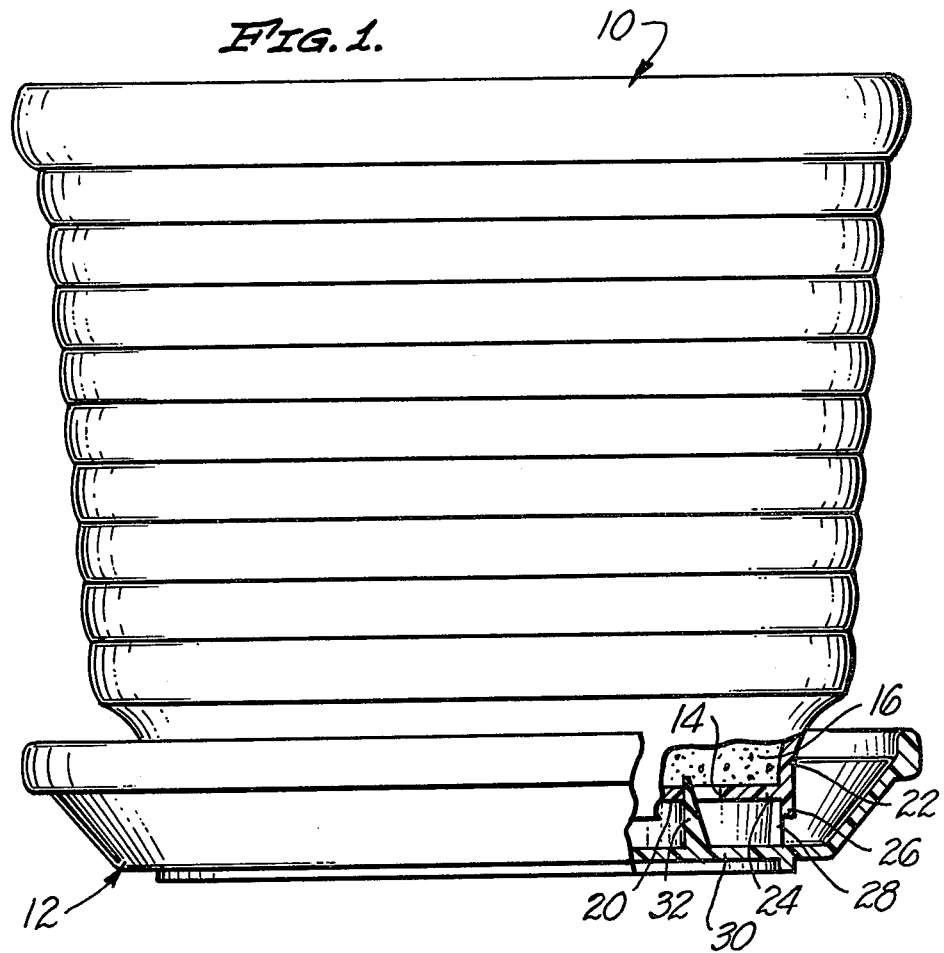
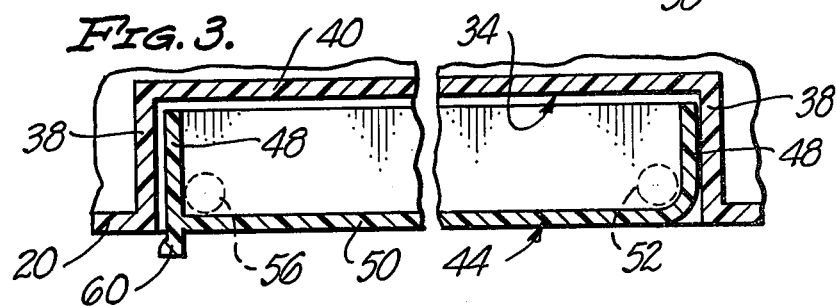
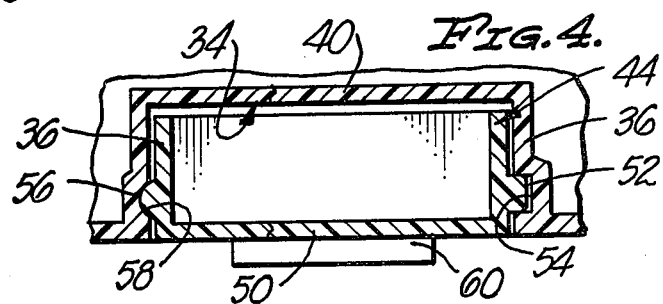

FLOWERPOT

BACKGROUND OF THE INVENTION

The invention set forth in this specification pertains to new and improved flowerpots or containers of a type commonly utilized to grow plants. More specifically, it pertains to flowerpots which are adapted to be used in hiding various different things or objects such as keys, money, notes, jewelry or the like.

Virtually everyone is familiar with the fact that a wide variety of different "things" or structures have been utilized for the purpose of hiding various different types of objects or things as indicated in the preceding discussion so that the presence of such objects or things will not be normally detected on casual inspection but so that such objects or things can be retrieved without significant difficulty whenever this is desired. It is considered that it would be effectively impossible to catalog in this specification all of the prior uses of door mats, money belts, hollow handles, false bottoms in containers and the like which have been proposed and to various extents used in hiding various different objects and things. Many of such prior structures have been comparatively complex and expensive and/or somewhat difficult to use. On occasion, they have not provided adequate protection for whatever is hidden in or by them from damage due to ambient conditions.

It is considered that the latter reason is probably responsible for the fact that flowerpots are not known to have been utilized in hiding various different things—especially keys. It is frequently desired to hide a key to a house adjacent to a door to the house in such a manner that it can be located by one having knowledge as to where the key is hidden. Frequently, such keys have been hidden under door mats, in lighting fixtures or other reltively non-visible locations. In general, keys are not adequately protected against ambient conditions such as rain when located in any of these locations. Further, such locations are so commonly used that individuals with improper motives will tend to look for them in such locations.

Since flowerpots are commonly utilized reasonably adjacent to the doors to homes, it is considered logical to utilize them for the purpose of hiding keys. Presumably, the reason that they have not been utilized for this purpose in the past relates to the need to protect a key—or anything else—hidden by a flowerpot so that the normal moisture present in association with a flowerpot will not cause corrosion or other damage. It is considered that any flowerpot which is to be satisfactorily utilized for hiding things or objects must be specially formed so as to not only obscure whatever is hidden in it but, in addition, so as to provide adequate protection against damage such as normally will be caused by moisture or other ambient influences.

SUMMARY OF THE INVENTION

A broad objective of the present invention is to provide new and improved containers for use in growing plants or flowerpots which are capable of being used in hiding things or objects and which protect such things or objects hid within them to an adequate extent against moisture and/or other ambient influences which might cause damage. The invention is also intended to provide flowerpots or containers as described which can be easily and conveniently manufactured at a comparatively nominal cost and which are capable of being used over prolonged periods both as flowerpots and as hiding various things or objects.

These various objectives of this invention are achieved by providing in a flowerpot or container adapted to grow plants having a bottom and a side wall structure attached to the bottom and extending upward from the periphery of the bottom the improvement which comprises: a downwardly opening, water impervious recess formed in said bottom and extending upwardly generally towards the interior of said container from said bottom and holding means for use in holding an object generally within said recess, said holding means being operatively associated with said bottom.

BRIEF DESCRIPTION OF THE DRAWING

Because of the nature of this invention it is best more fully explained by referring to the accompanying drawing in which:

FIG. 1 is a side elevational view of a presently preferred embodiment of a flowerpot and saucer combination of this invention;

FIG. 3 is a partial cross-sectional view at an enlarged scale taken at line 3—3 of FIG. 2; and FIG. 4 is a partial cross-sectional view at an enlarged scale taken at line 4—4 of FIG. 2.

Figure 2:
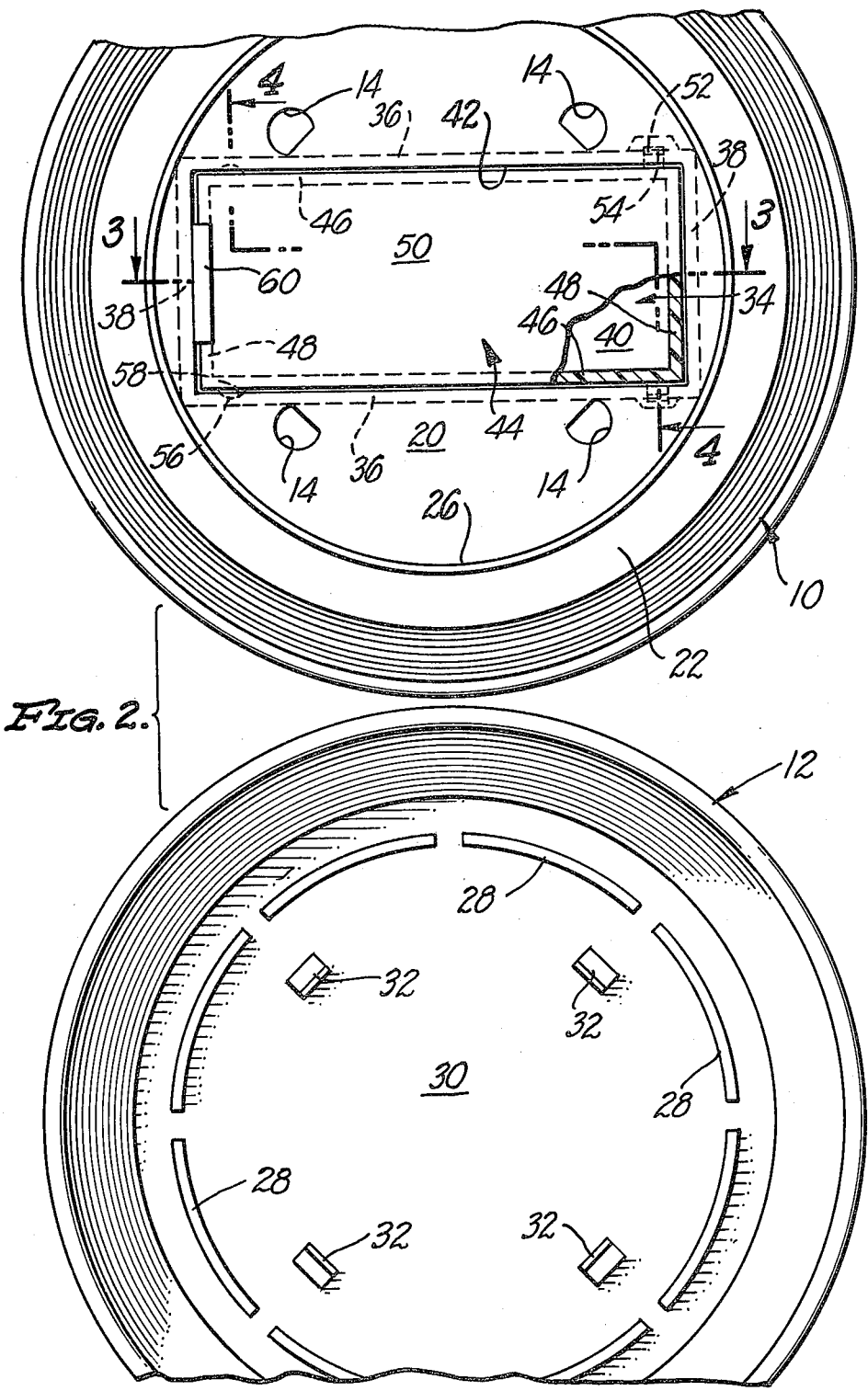
FIG. 2 is an exploded view showing the bottom of this flowerpot and the top of the saucer shown in FIG. 1.

The specific flowerpot or pot and saucer combination illustrated in the accompanying drawing is only a single structure embodying the operative concepts or principles of the present invention. These concepts and principles are verbally defined or set forth in the appended claims forming a part of this disclosure. Those skilled in the design and construction of flowerpots will realize that these concepts or principles can easily be embodied within many differently appearing and differently constructed flower pots through the use or exercise of routine mechanical engineering skill.

DETAILED DESCRIPTION

In the drawing there is shown a flowerpot 10 in accordance with this invention. This expression "flowerpot" is used herein in a broad generic sense so as to designate any container which is adapted or intended to be used in growing plants. Thus, this expression "flowerpot" is not intended to limit the present invention to containers which are used in growing flowers but is intended to designate containers or receptacles which can be utilized in growing various ornamental, non-flowering plants, various types of vegetables and the like. This flowerpot or pot 10 is normally employed with a so-called saucer 12 utilized to catch and hold various so-called "acid" or other liquids which are discharged through openings 14 in the bottom of the pot 10 as this pot 10 is used. When it is used, its interior is filled with soil 16 in which one or more plants 18 may be grown.

These openings 14 are located within the bottom 20 of this pot 10. The bottom 20 is surrounded in a conventional manner by a continuous upstanding wall 22 attached to the periphery 24 of this bottom 20. On many occasions, this wall 22 will not be a continuous wall but will consist of a plurality of different sides (not shown) in effect constituting a single wall. Under the circumstances, it is considered that it is sometimes preferable to refer to this wall 22 as a wall means. A short rim 26 may be located on the bottom 20 so as to extend downwardly from the periphery 24. This rim 26 is adapted to fit relative to a corresponding rim 28 which extends upwardly from the bottom 30 of the saucer 12 so as to achieve a desired position of the saucer 12 relative to the pot 10.

A plurality of projections 32 also extend upwardly from this bottom 30 of the saucer 12. These projections 32 are dimensioned and located so that when the saucer 12 is in place relative to the pot 10 each of the projections 32 fits within one of the openings 14 in such a manner as to frictionally hold the saucer 12 relative to the pot 10 in a position as indicated in FIG. 1. A similar holding action can be achieved in other ways such as, for example, by physical engagement of structures (not shown) corresponding to the projections 32 with the rim 26. Because of the functions of the projections 32, they be referred to as mounting or attaching means for use in attaching the saucer 12 to the pot 10 in such a manner as to permit the saucer 12 to be easily removed from or released from this pot 10. It will, of course, be obvious that a wide variety of different, diverse structures can be employed for this purpose of attaching this saucer 12 to the pot 10.

The novelty of the pot 10 centers about the inclusion within the bottom 20 of this pot 10 of a downwardly opening recess 34. This recess 34 includes parallel side walls 36, parallel end walls 38 and a top wall 40 extending generally between these walls 36 and 38. This structure provides a bottom opening 42 from the recess 34 which is directed downwardly while the recess 34 itself extends generally upwardly towards the interior of the pot 10. This recess 34 is designed so that it can act more or less as or in accordance with the so-called "diving bell" principle. When the saucer 12 is in position beneath the pot 10 and for one reason or another is filled with water, the interior (not separately numbered) of this recess 34 will remain filled with air. As a consequence of this, it is a location which may be utilized effectively to store keys or various other objects so that such things will not be damaged by the water or, even in the absence of water, by various conditions.

In order to utilize the recess 34 for hiding or storage type purposes it is, of course, necessary to provide some way or means of holding whatever is stored in this recess 34. Such a structure or means in the pot 10 comprises a small tray 44 having side walls 46, end walls 48 and a bottom 50. This tray 44 is dimensioned to fit within the recess 44 and is preferably of a somewhat resilient material capable of being flexed to a sufficient extent so as to "pop" or "snap" small shafts 52 into bearing openings 54 in the side walls 36. These shafts 52 are located on the walls 44 generally adjacent to an end wall 48. These shafts 52 and the bearing openings 54 constitute a means for pivotally mounting the tray 44.

The walls 46 adjacent to the other end 48 of the tray 44 include outwardly extending bumps or bosses 56 which are located so as to fit within correspondingly shaped depressions in the wall 36 when the tray 44 is in a closed position. This structure involving the bosses 56 and the depressions 58 may be regarded as or termed a detent means designed to releasably hold the tray 44 in the recess 36 so that it may be easily swung to a downwardly extending position whenever it is desired or necessary to gain access to the interior of this tray 44. The bosses 56 and the depressions 58 together act as the detents because of the resiliency of the side walls 56. Preferably, a small lip 60 is provided on the bottom 50 adjacent to the end wall 48 so as to facilitate movement of the tray from its closed position in which the bosses 56 are within the depressions 58.

It is believed that the manner of use of the pot 10 will be essentially obvious from the preceding. When the pot 10 is used without the saucer 12 in growing a plant, a person can gain access to the interior of the tray 44 by merely lifting up the pot 10 from whatever is supporting it and pivoting the tray 44 so that it extends downwardly from the bottom 20. The tray 44 will, of course, be closed when the pot 10 is to be replaced on the support. When, as preferred, the pot 10 is used in connection with the saucer 12, the sequence of operations involved in gaining access to the tray 44 will include the step of pulling the saucer 12 away from the pot 10 so as to expose the tray 44. Similarly, the saucer 12 must be replaced on the pot 10 prior to the saucer 12 being located on an appropriate supporting surface.

It is considered that it will be obvious from the preceding that the preferred mode of operation of the pot 10 as a hiding place requires that the walls 36, 38 and 40 of the recess 34 be water impervious and that preferably the tray 44 should also be water impervious so as to avoid it taking up water. It is considered that effective results are preferably achieved when both the entire pot 10 and the entire saucer 12 are manufactured out of a conventional polymer or plastic of a water resistant or waterproof character. Any such plastic should be of a type capable of resisting deterioration caused by normal ambient influences.

Preferably, the pot 10 used should be sufficiently large and heavy so that it is not apt to be knocked off of a supporting surface inadvertently as, for example, as the result of a wind storm. On the other hand, it is considered that the pot 10 as used should not be so large that the average person would have difficulty in lifting it and its contents in using the tray 44. Because of these considerations, it is considered that, as a practical manner, that the pot 10 should be dimensioned so that when filled with soil and a plant that the complete weight of the pot 10 and its contents will be from about 1 kilogram to about 15 kilograms with an optimum weight being of a weight of from about 5 to about 10 kilograms.

I claim:

1. In a flower pot which is adapted to grow plants having a body provided with a bottom and a side wall structure attached to said bottom and extending upwardly from the periphery of said bottom the improvement which comprises:
    a downwardly opening, water impervious recess formed in said body and extending upwardly from said bottom generally towards the interior of said container, and
    holding means within said recess, separate from said body of said flower pot and being moveable with respect to said body without disturbing the function of the flower pot for use in holding an object generally within said recess, said holding means being operatively associated with said bottom.

2. A flowerpot as claimed in claim 1 wherein:
    said holding means comprises tray means engageable with said recess for holding an object mounted on said bottom said holding means being movable between a position in which said tray means is within said recess and a position in which said tray means is located so as to permit access to the interior of said tray means.

3. A flowerpot as claimed in claim 2 wherein:

said tray means is pivotally mounted on said bottom so as to be capable of being pivoted between said positions, and including detent means for holding said tray means generally within said recess.

4. A flowerpot as claimed in claim 1 including:

saucer means attached to said flowerpot so as to extend generally beneath said bottom in order to enclose the space beneath said bottom and around the periphery of said bottom, and attaching means connecting said saucer means and said flowerpot said attaching means securing said saucer means to said flowerpot in such a manner that said saucer means can be removed from said flowerpot in order to expose said holding means in said recess.

5. A flowerpot as claimed in claim 4 wherein:

said holding means comprises tray means for holding an object mounted on said bottom so as to be movable between a position in which said tray means is within said recess and a position in which said tray means is located so as to permit access to the interior of said tray means.

6. A flowerpot as claimed in claim 3 wherein:

said holding means comprises tray means for holding an object mounted on said bottom so as to be movable between a position in which said tray means is within said recess and a position in which said tray means is located so as to permit access to the interior of said tray means.

* * * * *